(12) United States Patent
Hars

(10) Patent No.: US 9,794,062 B2
(45) Date of Patent: Oct. 17, 2017

(54) SCRAMBLED TWEAK MODE OF BLOCKCIPHERS FOR DIFFERENTIAL POWER ANALYSIS RESISTANT ENCRYPTION

(71) Applicant: The Boeing Company, Chicago, IL (US)

(72) Inventor: Laszlo Hars, Lafayette, CO (US)

(73) Assignee: THE BOEING COMPANY, Chicago, IL (US)

( * ) Notice: Subject to any disclaimer, the term of this patent is extended or adjusted under 35 U.S.C. 154(b) by 112 days.

(21) Appl. No.: 14/878,316

(22) Filed: Oct. 8, 2015

(65) Prior Publication Data

US 2017/0104586 A1    Apr. 13, 2017

(51) Int. Cl.

| H04L 29/06 | (2006.01) |
|---|---|
| H04L 9/06 | (2006.01) |
| H04L 9/00 | (2006.01) |
| H04L 9/08 | (2006.01) |

(52) U.S. Cl.
CPC ............ *H04L 9/0637* (2013.01); *H04L 9/003* (2013.01); *H04L 9/0631* (2013.01); *H04L 9/0861* (2013.01)

(58) Field of Classification Search
USPC ......................................................... 713/189
See application file for complete search history.

(56) References Cited

U.S. PATENT DOCUMENTS

| 2011/0255689 A1* | 10/2011 | Bolotov | H04L 9/0631 380/42 |
|---|---|---|---|
| 2012/0121083 A1* | 5/2012 | You | H04L 9/0631 380/28 |
| 2013/0073850 A1* | 3/2013 | Zaverucha | H04L 9/0869 713/168 |
| 2016/0080143 A1* | 3/2016 | Kindarji | H04L 9/0637 380/28 |

OTHER PUBLICATIONS

"Tweakable Block Ciphers"; M Liskov et al;Laboratory for Computer Science, Massachusetts Institute of Technology, Cambridge, MA 02139, USA 16 pages; https://people.eecs.berkeley.edu/~daw/papers/tweak-crypto02.pdf.*

(Continued)

*Primary Examiner* — Jason Lee
(74) *Attorney, Agent, or Firm* — MH2 Technology Law Group, LLP

(57) ABSTRACT

A system and method for providing a scrambled tweak mode of block cipher encryption for a device that mitigates the effect of side channel attacks based on differential power analysis (DPA). The scrambled tweak mode encryption engine creates noise at the start of the encryption process by obfuscating the counter value with the use of the very fast mixing function, such as a mixing function based on a XOR tree, substitution-permutation networks, or double-mix Feistel networks. The mixing function uses some secret key material, which diversifies its behavior between different instantiations. Because the counter values are scrambled and the mixing functions operate very fast in parallel hardware, the input of the block cipher is pseudorandom and groups of blocks can't be correlated.

21 Claims, 7 Drawing Sheets

(56) References Cited

OTHER PUBLICATIONS

"Counter-in-Tweak: Authenticated Encryption Modes for Tweakable Block Ciphers"; By Thomas Peyrin and Yannick Seurin; 31 pages; International Association for Cryptologic Research 2016 M. Robshaw and J. Katz (Eds.): CRYPTO 2016, Part I, LNCS 9814, pp. 33-63, 2016.*
U.S. Appl. No. 14/472,978, filed Aug. 29, 2014 to Hars.
U.S. Appl. No. 14/473,006, filed Aug. 29, 2014 to Hars.
U.S. Appl. No. 14/473,042, filed Aug. 29, 2014 to Hars.
"Counter mode (CTR)," 2015, Wikipedia article—http://en.wikipedia.org/wiki/CTR_mode#CTR [Sep. 3, 2015], 14 pages, (see pp. 10-11).
"Output Feedback mode (OFB)," 2015, Wikipedia article—http://en.wikipedia.org/wiki/Output_feedback#OFB [Sep. 3, 2015], 14 pages, (see pp. 9-10).
"XTS encryption mode," 2015, Wikipedia article—http://en.wikipedia.org/wiki/XTS_mode#XEX-based_tweaked-codebook_mode_with_ciphertext_stealing_.28XTS.29 [May 11, 2015], 6 pages, (see pp. 3-4).
"SHA-2," 2015, Wikipedia article—http://en.wikipedia.org/wiki/SHA-2 [Oct. 7, 2015], 13 pages.
"Message authentication code," 2015, Wikipedia article—http://en.wikipedia.org/wiki/Message_authentication_code [Oct. 7, 2015], 4 pages.
Extended European Search Report dated Mar. 9, 2017 for counterpart European patent application No. 16192970.8.
Minematsu, Kazuhiko, et al, "Improvied Security Analysis of XEX and LRW Modes," Aug. 17, 2006 (Aug. 17, 2006), Network and Parallel Computing; [Lecture Notes in computer Science; Lect. Notes Computer], Springer International Publishing, Cham, pp. 96-113.
Rogaway, Phillip, "Efficient Instantiations of Tweakable Blockciphers and Refinements to Modes OCB and PMAC Contents", Sep. 24, 2004 (Sep. 24, 2004).
Liskov, Moses et al., "Tweakable Block Ciphers," Journal of Cryptology, Jul. 1, 2011 (Jul. 1, 2011), pp. 588-613.

* cited by examiner

SCRAMBLED TWEAK MODE OF BLOCKCIPHERS FOR DIFFERENTIAL POWER ANALYSIS RESISTANT ENCRYPTION

TECHNOLOGICAL FIELD

The present disclosure relates generally to data encryption modes and, in particular, to an improved system that uses mixing functions to scramble counter values in a cipher operating in tweaked encryption mode to mitigate the effect of attacks based use of differential power analysis (DPA).

BACKGROUND

The aviation industry largely depends on the reliable functioning of critical information technology infrastructure. Like many other industries, the aviation industry is challenged with providing adequate security for such IT infrastructure and mitigating the effects of any cyber events. Examples of cyber events include malicious or suspicious events that compromise, or attempt to compromise, the operation of an aircraft's network, including its data connections, data transmission, and computing systems.

The secrecy and integrity of stored or transmitted data can generally be assured by cryptographic means when no adversary has physical access to the electronic devices processing the data. This is because during the operation of such devices, some information about secret keys or sensitive data always leaks in side channels, including variation of response times, fluctuation of power use, or ultrasonic or electromagnetic wave radiation. In order to optimize security, fast encryption modes with reduced side channel leakage are needed that do not significantly increase processing time, system complexity, the size of electronic circuits, or energy usage.

As shown in FIG. 1, standard Federal Information Processing Standards (FIPS)-approved XTS tweak mode encryption engines (hardware and/or software) 100 have simple structures that use standard block ciphers 102 operating with a fixed key but wherein the input and output is modified or "tweaked." In order to generate the tweak values, which are XORed to the input (plaintext) and output (ciphertext) of the block cipher 102, the XTS tweak mode encryption engine 100 uses an iterative algorithm of repeated Galois multiplications with a simple polynomial starting with an encrypted (secret) initial value (IV).

XTS tweak encryption mode is a variant of XOR-Encrypt-XOR (XEX) type of tweakable encryption modes, that allows efficient processing of consecutive blocks (with respect to the block cipher 102 used) within one data unit (e.g., a disk sector). The tweak is represented as a combination of the sector address and index of the block inside the sector. Every ciphertext block C, is obtained using:

$$X = E_K(I) \otimes \alpha^j$$

$$C = E_K(P \oplus X) \oplus X$$

where:
P is the plaintext;
I is the number (index) of the sector in the block, corresponding to the IV for message encryption;
$\alpha$ is the primitive element of the Galois field $GF_{2^{128}}$ defined by the simple polynomial x; and
j is the number (index) of the block.

XTS tweak encryption mode can be implemented in parallel, but data blocks far from the beginning of the plaintext message need longer computation for their tweak, meaning that the computation of $\alpha^j$ takes time proportional to log(j) even in massive parallel circuits. Therefore, at some point, more than a single clock cycle is necessary for the generation of the tweak values. This has the negative result of increasing the processing time.

Further, half of the time (in the average), simply left-shifting of $\alpha^j$ gives $\alpha^{j+1}$, which is a regularity of the data pattern that is exploitable by side channel attacks, such as attacks based on differential power analysis (DPA). DPA measures the changing power signals as the device processes and encrypts data. A DPA attack records power traces and groups them by the known input bits of the block cipher.

Yet another problem with XTS tweak encryption mode is latency because before the encryption begins the IV has to be encrypted. This causes a delay of a full encryption operation (e.g., several clock cycles).

Thus, it is desirable to have an improved tweak mode encryption system for mitigating side channel attacks that does not significantly increase processing time or energy usage.

BRIEF SUMMARY

In view of the foregoing background, example implementations of the present disclosure provide a system for improving the security of a device including a first mixing unit that scrambles a first initial value for a first segment of data, and a first block cipher operating in a tweak mode that encrypts the first segment of data to produce a first ciphertext message from a first plaintext message. The scrambled first initial value is XORed to the input and output of the first block cipher. The first initial value may be an address of the first segment of data, a random number, a sequence number, or a then-current value of real-time clock. The first mixing unit maps the first segment of data's block size input with the first segment of data's block size output. The first mixing unit is invertible and is non-linear. The first mixing unit may be a XOR tree mixing unit, substitution-permutation mixing unit, or double-mix Feistel mixing unit. The first block cipher is a FIPS approved AES cipher.

The system further includes a second mixing unit that scrambles a second initial value for a second segment of data, and a second block cipher operating in a tweak mode that encrypts the second segment of data to produce a second ciphertext message from a second plaintext message. The scrambled second initial value is XORed to the input and output of the second block cipher. The system is parallelizable such that the second ciphertext message can be generated without using the first ciphertext message. An identical key may be used for first block cipher and the second block cipher. The scrambled first initial value has no statistical correlation with the scrambled second initial value.

Implementations of the present disclosure further provide a system for improving the security of a device including a tweak mode encryption engine that receives data, applies a block cipher operating in a tweak mode in connection with a counter to a segment of the data, applies a mixing function to the counter of the block cipher, and processes remaining segments of the data with the block cipher while applying the mixing function to the counter for each segment of the data.

In yet another implementation of the present disclosure, a method for improving the security of a device is provided that includes the steps of scrambling with a first mixing unit a first initial value for a first segment of data, encrypting with a first block cipher the first segment of data to produce a first ciphertext message from a first plaintext message, and XORing the scrambled first initial value to the input and output of the first block cipher. The method further includes the steps of scrambling with a second mixing unit a second initial value for a second segment of data, encrypting with a second block cipher the second segment of data to produce a second ciphertext message from a second plaintext message, and XORing the scrambled second initial value to the input and output of the second block cipher.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
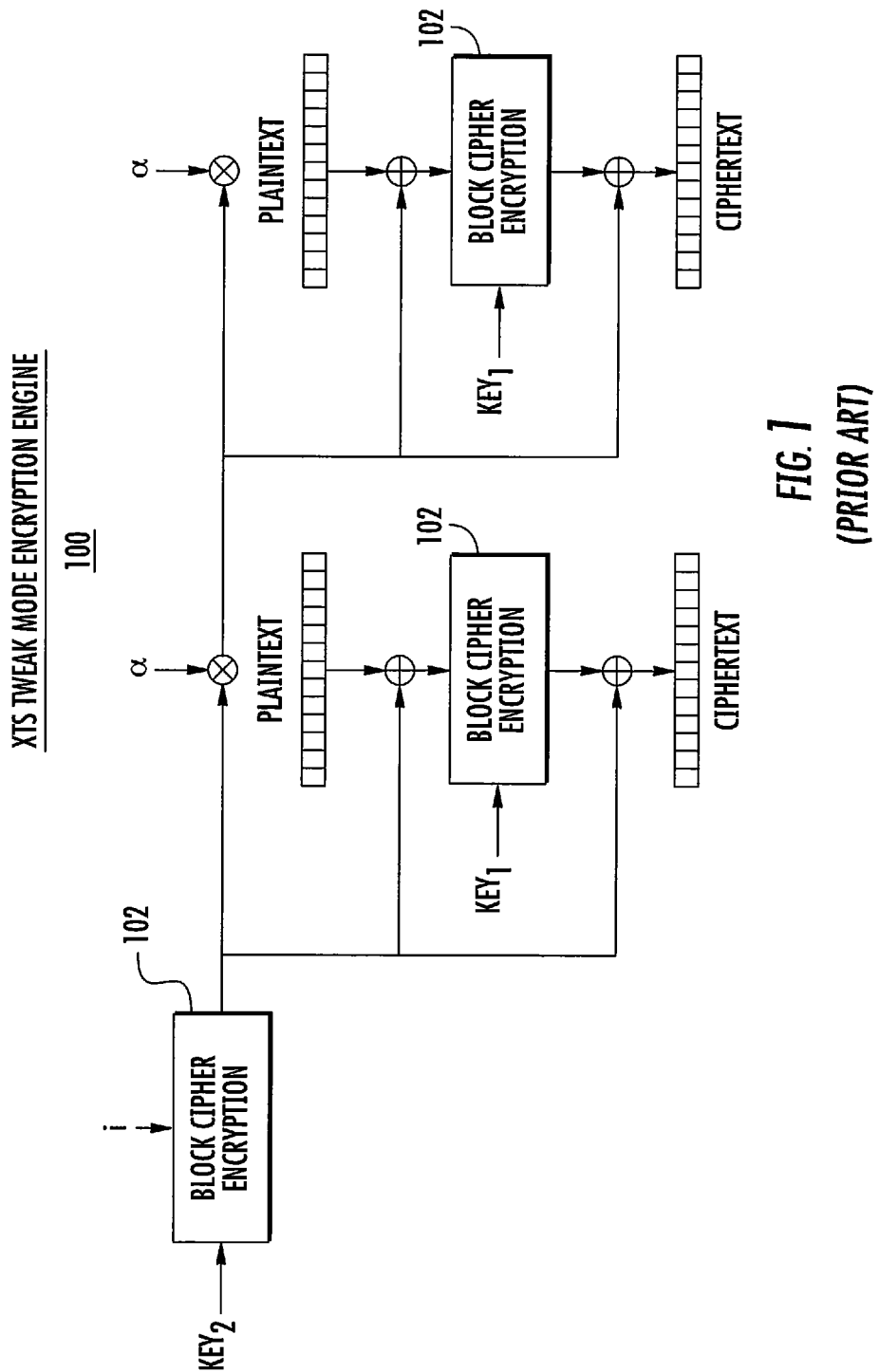
FIG. 1 is logic diagram of a prior art XTS tweak mode encryption engine.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure will be primarily described in conjunction with aviation applications. It should be understood, however, that example implementations may be utilized in conjunction with a variety of other applications, both in the aviation industry and outside of the aviation industry.

Figure 2:
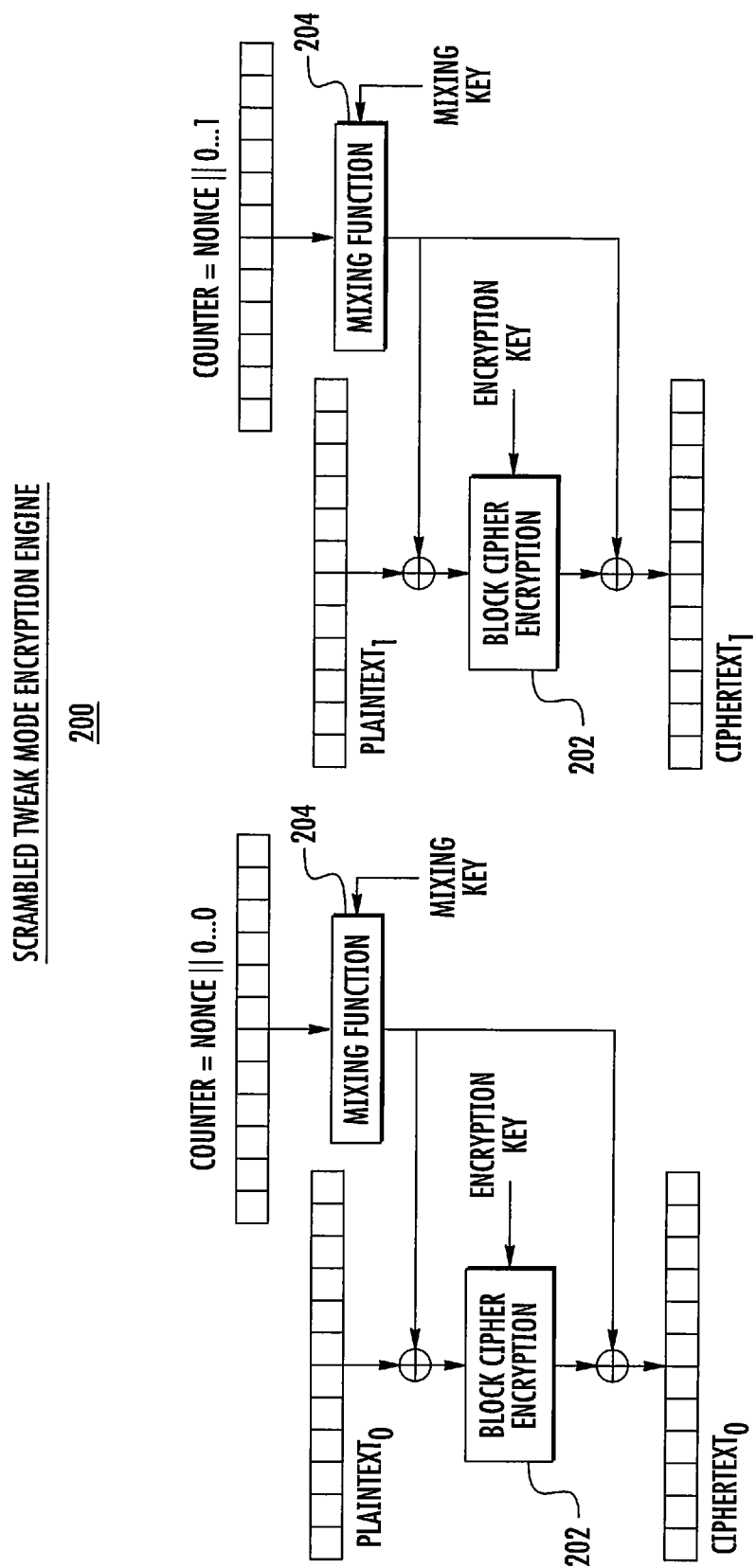
FIG. 2 is a logic diagram of a scrambled tweak mode encryption engine in accordance with an example implementation of the present disclosure.

According to example implementations of the present disclosure, and as shown in FIG. 2, the present invention is a scrambled tweak mode encryption engine 200. Similar to the prior art XTS tweak mode encryption engine 100 described with respect to FIG. 1 above, the scrambled tweak mode encryption engine (hardware and/or software) 200 uses tweak values for the input and the output of each block cipher 202 in the series of ciphers 202, the i-th of them being denoted by cipher[i]. However, unlike the prior art XTS tweak mode encryption engine 100, the scrambled tweak mode encryption engine 200 incorporates the use of very fast and thorough mixing functions 204, referred to herein as MIX, which are described in more detail below. Thus, in the scrambled tweak mode encryption engine 200, T[i], the i-th tweak value, is defined as either: (a) T[i]=MIX(IV, i). The initial value (IV) is given by the entity or user requesting the encryption, and it can be left out (using all 0's as the default); or (b) T[i]=MIX(IV⊕i), where ⊕ denotes a bitwise exclusive OR, also known as an XOR operation.

The encryption of the i-th plaintext block P[i] produces the i-th ciphertext block C[i], using the key K, which does not change during the encryption of the message: C[i]= cipher$_K$[i] (T[i]⊕P[i])⊕T[i]. That is, the mixed sequence number of the input blocks, T[i] is XORed to the input and also to the output of every block cipher[i] 202, as a tweak value. The decryption process is the same, except the block cipher 202 is used in reverse (decryption mode): P[i]=cipher$_K^{-1}$[i] (T[i]⊕C[i])⊕T[i].

The IV input can be the address of the data, a sequence number or ID of messages, the current value of a real time clock, or a long enough random number, such that the chance of a repetition will be negligible. However, because the scrambled tweak mode encryption engine 200 does not require unique IVs, the encryption is secure with even a constant IV=0. It is a good practice to diversify the encryption, however, because an eavesdropper could otherwise find the identical encrypted versions of identical plaintext blocks, which may or may not be a security risk, depending on the application.

The mixing functions 204 are similar to block ciphers 202 but they are much faster. The mixing functions 204 are also less secure than the block ciphers 202 because some correlation may exist between their input and output, thereby making them generally unfit for encryption operations by themselves. However, when either the input or the output of a mixing function 204 is hidden from an attacker, the attacker cannot mount traditional cryptologic attacks or side-channel attacks, such as DPA-type attacks. Thus, the fast mixing functions 204 are ideal for cryptographic key generation, including secret keys producing other secret keys.

The mixing functions 204 used in the scrambled tweak mode encryption engine 200 have the following properties:
 1) They map n-bit input to n-bit output (n=block size).
 2) The mixing depends on a large amount of secret key material, which can be generated from a single key and/or a random number generator.
 3) The mixing function is bijection (invertible).
 4) Every input bit influences every output bit in non-linear way.
 5) Every nonempty set of input bits also influences every output bit (no effect cancels).

Figure 4:
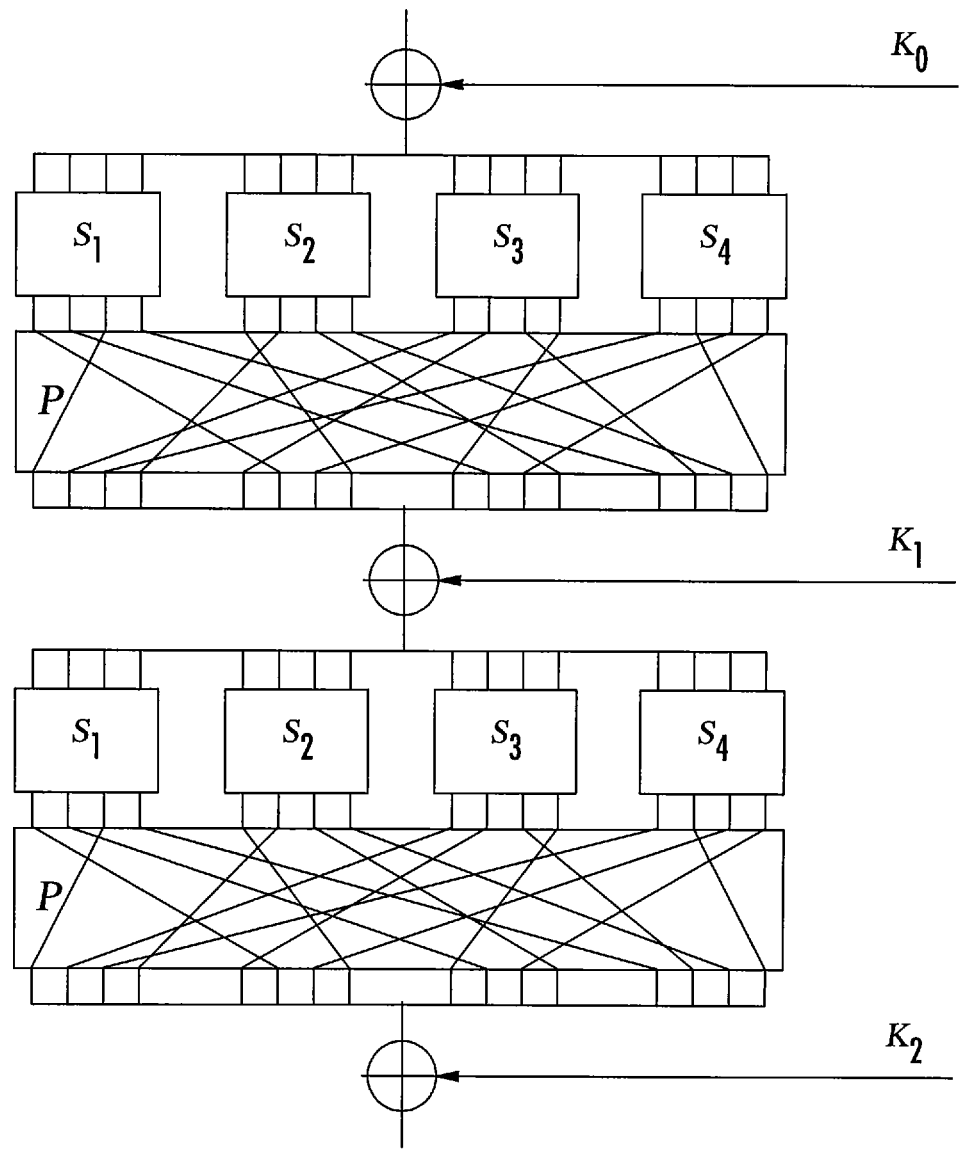
FIG. 4 is a logic diagram of a substitution-permutation network based key generator for a mixing function in accordance with an example implementation of the present disclosure.
Figure 5:
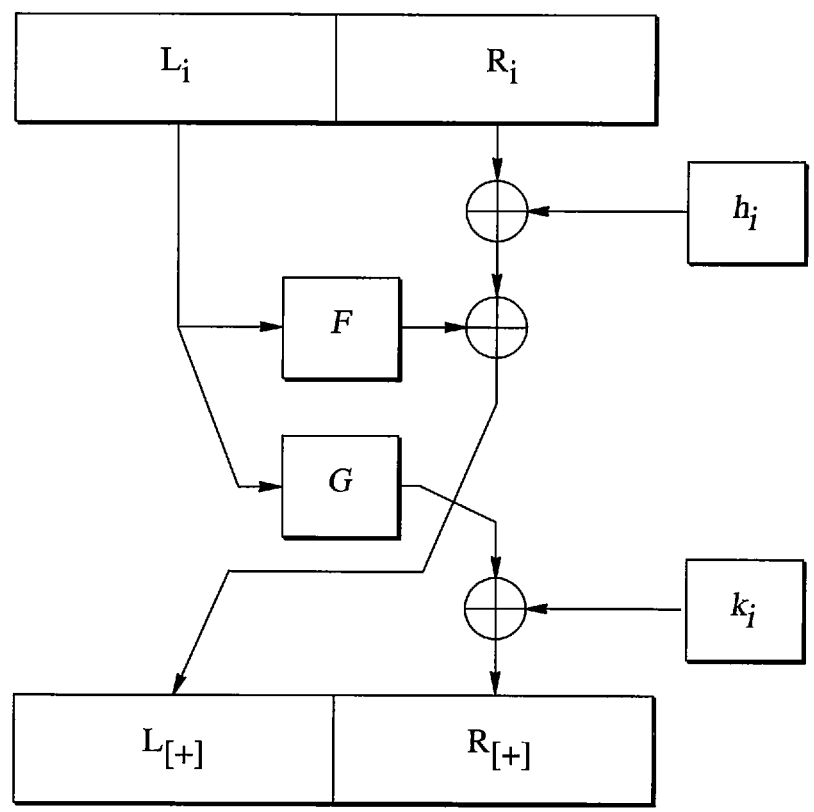
FIG. 5 is a logic diagram of a double-mix Feistel network based key generator for a mixing function in accordance with an example implementation of the present disclosure.

According to example implementations of the present disclosure, suitable mixing functions for use in the scrambled tweak mode encryption engine 200 are XOR trees (FIG. 3), substitution-permutation networks (FIG. 4), and double-mix Feistel networks (FIG. 5). The non-linearity of the mixing functions 204, as referenced above, may be provided by arithmetic additions of shifted data or S-Boxes, which can degenerate to (N)AND/OR gates (2×1 bit S-Boxes). When two input parameters are supplied, the second parameter replaces a part of the first mixing subkey.

Figure 3:
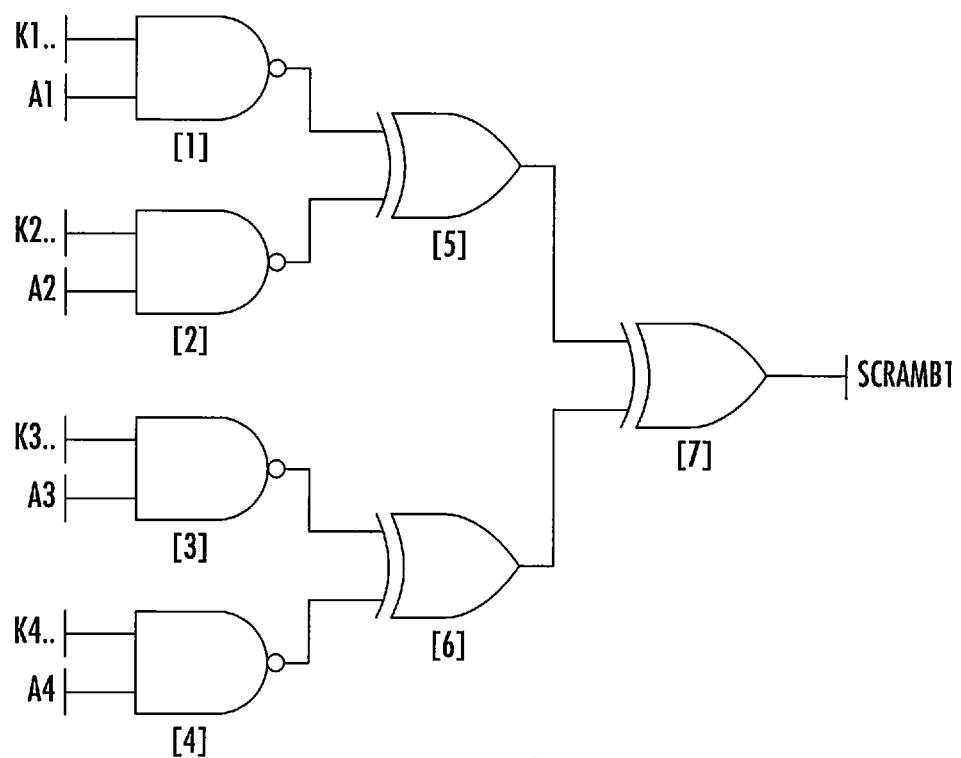
FIG. 3 is a logic diagram of a XOR tree based key generator for a mixing function in accordance with an example implementation of the present disclosure.

Referring now to FIG. 3 regarding the mixing function 204 using a XOR tree based key generator, the input bits A1, A2, A3 . . . select corresponding subkeys K1, K2, K3 . . . to XOR. The final scramble operation step makes the construction non-linear and can be a couple of rotate-add operations, or a series of nonlinear S-Box operations. The XOR tree based key generator may further include additional input selects, including rotated subkeys.

Referring now to FIG. 4 regarding the mixing function 204 using a substitution-permutation network based key generator, the input bits are fed in from the top of the logic diagram, and the output is taken from the bottom of the logic diagram. The subkeys $K_i$ are independent randomly created secrets. $S_1$, $S_2$ . . . are S-Boxes, which are small, non-linear substitution functions. The number of layers of the mixing network is chosen to be at least twice of the full mixing depth (when every input bit effects every output bit).

Referring now to FIG. 5 regarding the mixing function 204 using a double-mix Feistel network based key generator, F is a non-linear, very difficult (or impossible) to invert function, whereas G is invertible. In implementations with parallel operating electronic circuits, the mixing performance of the Feistel network is double that of the traditional Feistel networks. $[L_0, R_0]$ is the input of the mixing function and the output is taken from the bottom of the logic diagram. The number of layers of the mixing network is chosen to be as high as fits to a single clock-cycle requirement.

Referring again to FIG. 2, the scrambled tweak mode encryption engine 200 is fully parallelizable in that each block cipher[i] 202 can be a different hardware core, or executed in software on a different hardware core. If the plaintext message is longer than the number of available block ciphers 202, subsequent segments of the plaintext message are encrypted with previously used cipher blocks 202, with appropriately incremented input counter values "i".

The disclosed scrambled tweak mode encryption engine 200 does not have the same weakness as the Electronic Code Book encryption mode (ECB), for example, where each block of the plaintext message is processed with the same block cipher, directly. In the ECB mode, if the same data is repeated in the plaintext, the corresponding ciphertext blocks will be the same, revealing certain data regularities. In the scrambled tweak mode encryption engine 200 as described herein, every cipher block 202 has a different tweak value, so repetitions in the plaintext will not produce recognizable patterns in the ciphertext. In an additional implementation of the present invention, a message authentication code could be attached to the ciphertext to further ensure authenticity of the ciphertext.

The scrambled tweak mode encryption engine 200 as described herein includes the following elements:
1) The encryption is constructed from a secure block cipher 202 that is, for example the FIPS approved Advanced Encryption Standard (AES) cipher.
2) The encryption of long messages is parallelizable, meaning that: (a) any ciphertext block of a long message can be generated without using other ciphertext blocks; and (b) any auxiliary value (e.g. tweak value) can be computed with a small amount of computational work.
3) The same key can be used for many (or all) of the block ciphers 202 so the internal key schedule of the cipher 202 can be cached or the cipher 202 can be otherwise optimized (unlike prior art key rolling that uses different keys for each cipher and is accordingly slow).
4) The input of the block ciphers 202 is unknown to an attacker, which helps to thwart DPA attacks.
5) The input values of any two ciphers 202 is statistically uncorrelated, which further helps to thwart DPA attacks.
6) Any auxiliary computation (e.g. scrambling of the counter and XORing the tweak to the text) is very fast, such that no DPA-type attacks are feasible against the auxiliary computation.

The scrambled tweak mode encryption engine 200 as described herein is thus very useful in situations where an attacker can observe side channel leakages from the encryption or decryption devices. This is because the scrambled tweak mode encryption engine 200 uses the very fast mixing functions 204 to generate the tweak values instead of the simple, iterative, and slow Galois multiplication steps used in prior art XTS tweak encryption engines. Because the input of the mixing function 204 is the current value of the block number (index), possibly combined with an IV and some secret key material, the behavior is diversified between different instantiations, even when the same key is used for the cipher 202. This makes the step of the slow generation of the initial secret tweak of prior art XTS superfluous.

Also, because the scrambled tweak mode encryption engine 200 obfuscates counter values for tweaks such that the input of the block cipher 202 is pseudorandom (unknown to the attacker), groups of blocks can't be correlated, thereby preventing most exploitable side channel leakage of the employed cipher 202, which renders DPA-type side channel attacks ineffective. This is another significant improvement over prior art XTS encryption engines.

In addition to the scrambled tweak mode encryption engine 200 improving the security of standard encryption modes, use of such scrambled tweak mode encryption engine 200 is low cost and does not significantly increase circuit size, power usage, or processing time. Compared to known encryption systems with key rolling methods for protection from side channel analysis attacks, when the scrambled tweak mode encryption engine 200 is used, the encryption or decryption speed and also the power consumption decreases about two fold. Therefore, slower electronic components can be used, which further reduce the energy consumption of the corresponding computing system without compromising security. Example computer systems include flight computers, military and space programs, corporate networks, personal and laptop computers, smart mobile devices, even secure communication networks.

According to example implementations of the present disclosure, the various components of the scrambled tweak mode encryption engine 200 may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the scrambled tweak mode encryption engine 200 and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the system 100 of the present disclosure may include one or more of a number of components such as a processor (e.g., processor unit) connected to a memory (e.g., storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of scrambled tweak mode encryption engine 200. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 6:
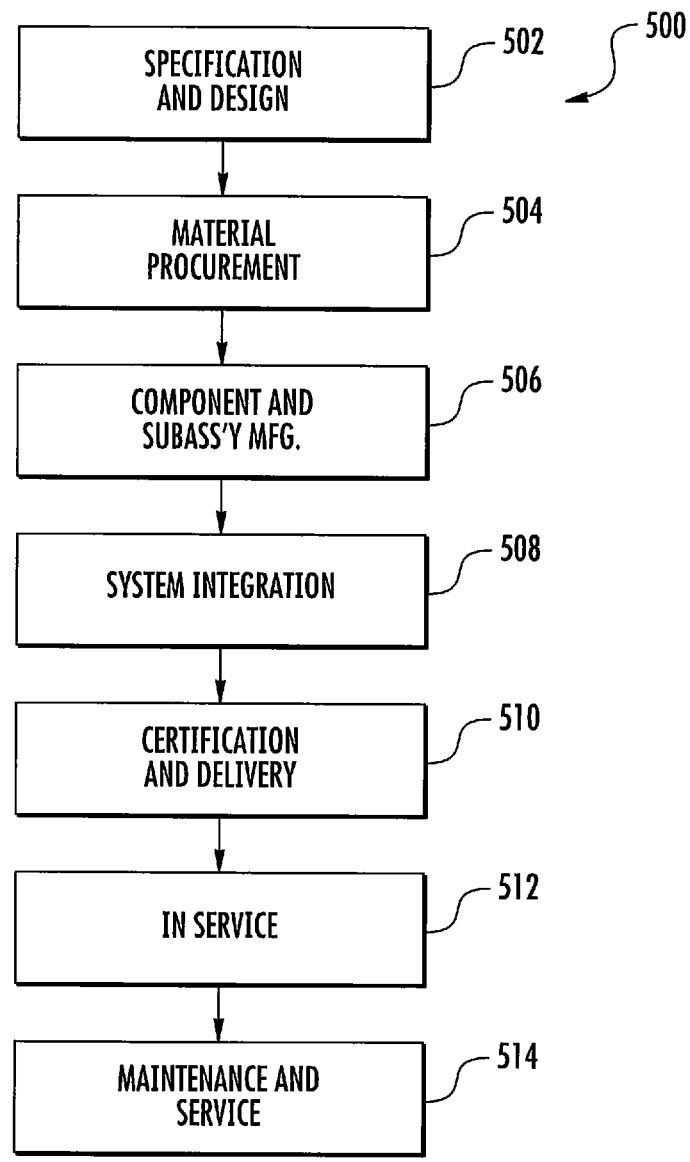
FIG. 6 is a block diagram of aircraft production and service methodology.
Figure 7:
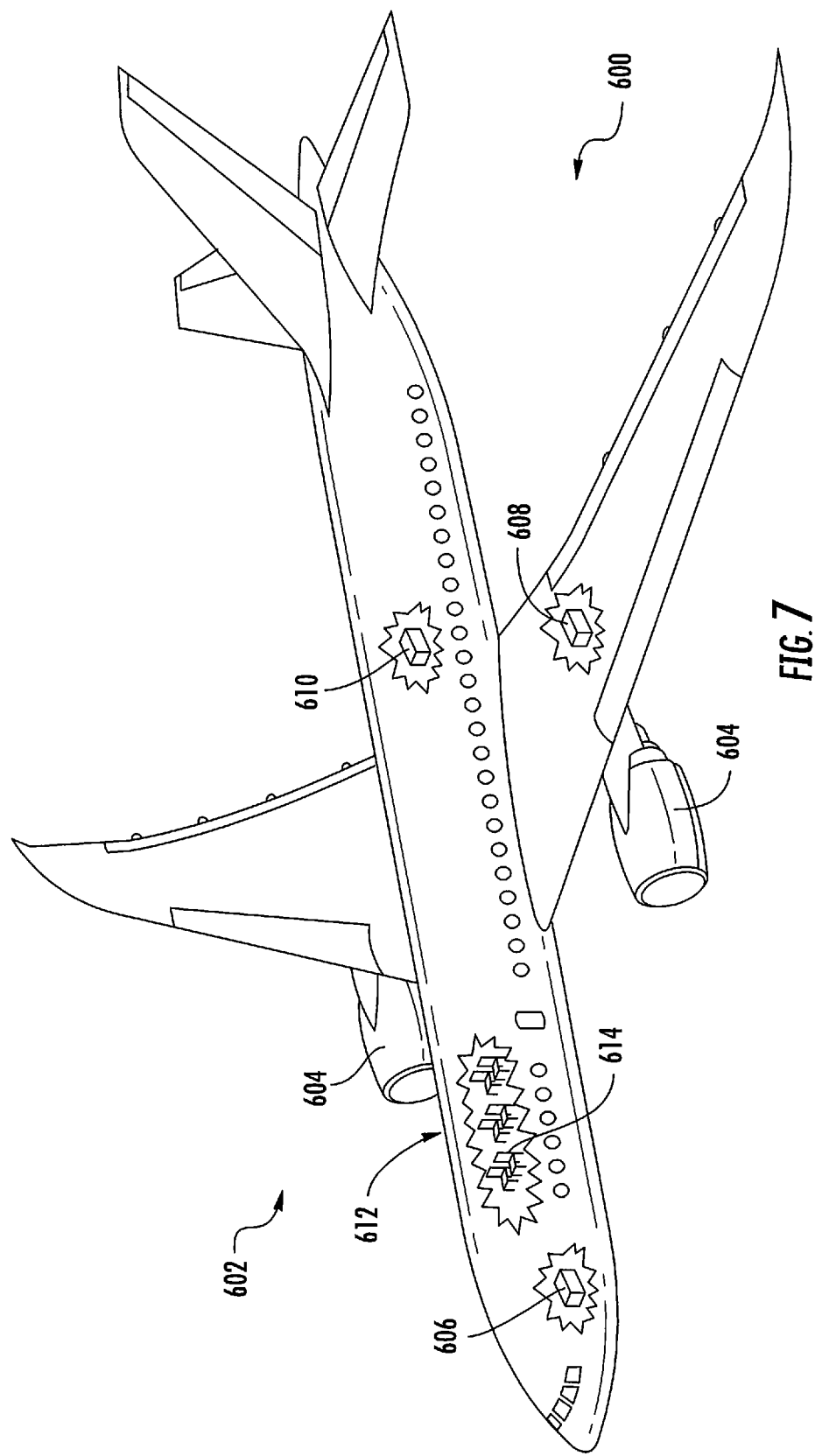
FIG. 7 is a schematic illustration of an aircraft.

As referenced above, examples of the present disclosure may be described in the context of aircraft manufacturing and service. As shown in FIGS. 6 and 7, during pre-production, illustrative method 500 may include specification and design (block 502) of aircraft 602 and material procurement (block 504). During production, component and subassembly manufacturing (block 506) and system integration (block 508) of aircraft 602 may take place.

Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc. of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for improving security of a device comprising:
   a first mixing unit that scrambles a first initial value for a first segment of data; and
   a first block cipher operating in a tweak mode that encrypts the first segment of data to produce a first ciphertext message from a first plaintext message;
   wherein the scrambled first initial value is XORed to the input and output of the first block cipher; and
   wherein the first mixing unit is selected from the group consisting of a XOR tree mixing unit, substitution-permutation mixing unit, and double-mix Feistel mixing unit.

2. The system of claim 1 wherein the first initial value is selected from the group consisting of an address of the first segment of data, a random number, a sequence number, and a then-current value of real-time clock.

3. The system of claim 1 wherein the first mixing unit maps the first segment of data's block size input with the first segment of data's block size output.

4. The system of claim 1 wherein the first mixing unit is invertible.

5. The system of claim 1 wherein the first mixing unit is non-linear.

6. The system of claim 1 wherein the first block cipher is a Federal Information Processing Standard (FIPS) approved AES cipher.

7. The system of claim 1 further comprising:
   a second mixing unit that scrambles a second initial value for a second segment of data; and
   a second block cipher operating in a tweak mode that encrypts the second segment of data to produce a second ciphertext message from a second plaintext message;
   wherein the scrambled second initial value is XORed to the input and output of the second block cipher.

8. The system of claim 7 wherein the system is parallelizable such that the second ciphertext message can be generated without using the first ciphertext message.

9. The system of claim 7 wherein an identical key is used for first block cipher and the second block cipher.

10. The system of claim 7 wherein the scrambled first initial value has no statistical correlation with the scrambled second initial value.

11. A system for improving security of a device comprising a tweak mode encryption engine that:
    receives data;
    applies a block cipher operating in a tweak mode in connection with a counter to a segment of the data;
    applies a mixing function to the counter of the block cipher; and
    processes remaining segments of the data with the block cipher while applying the mixing function to the counter for each segment of the data;
    wherein the mixing function is selected from the group consisting of a XOR tree mixing function, substitution-permutation mixing function, and double-mix Feistel mixing function.

12. A method for of claim for improving security of a device comprising the steps of:

scrambling with a first mixing unit a first initial value for a first segment of data;

encrypting with a first block cipher the first segment of data to produce a first ciphertext message from a first plaintext message; and XORing the scrambled first initial value to the input and output of the first block cipher;

wherein the first mixing unit is selected from the group consisting of a XOR tree mixing unit, substitution-permutation mixing unit, and double-mix Feistel mixing unit.

13. The method of claim 12 wherein the first initial value is selected from the group consisting of an address of the first segment of data, a random number, a sequence number, and a then-current value of real-time clock.

14. The method of claim 12 further comprising the step of mapping the first segment of data's block size input with the first segment of data's block size output.

15. The method of claim 12 wherein the first mixing unit is invertible.

16. The method of claim 12 wherein the first mixing unit is non-linear.

17. The method of claim 12 wherein the first block cipher is a Federal Information Processing Standard (FIPS) approved AES cipher.

18. The method of claim 12 further comprising the steps of:

scrambling with a second mixing unit a second initial value for a second segment of data;

encrypting with a second block cipher the second segment of data to produce a second ciphertext message from a second plaintext message; and XORing the scrambled second initial value to the input and output of the second block cipher.

19. The method of claim 18 further comprising the step of generating the second ciphertext message without using the first ciphertext message.

20. The method of claim 18 further comprising the step of using an identical key for the first block cipher and the second block cipher.

21. The method of claim 18 wherein the scrambled first initial value has no statistical correlation with the scrambled second initial value.

* * * * *